US012749433B2

(12) United States Patent
Hudson et al.

(10) Patent No.: US 12,749,433 B2
(45) Date of Patent: Sep. 29, 2026

(54) SIGNAL SYNCHRONIZATION FOR A DISPLAY

(71) Applicant: Google LLC, Mountain View, CA (US)

(72) Inventors: Edwin Lyle Hudson, San Jose, CA (US); Bo Li, Folsom, CA (US); Samuel Tien-en Lee, Mountain View, CA (US); Kaushik Indravadan Sheth, Los Altos, CA (US)

(73) Assignee: Google LLC, Mountain View, CA (US)

( * ) Notice: Subject to any disclaimer, the term of this patent is extended or adjusted under 35 U.S.C. 154(b) by 0 days.

(21) Appl. No.: 18/920,286

(22) Filed: Oct. 18, 2024

(65) Prior Publication Data

US 2025/0131951 A1 Apr. 24, 2025

Related U.S. Application Data

(60) Provisional application No. 63/591,877, filed on Oct. 20, 2023.

(51) Int. Cl.
*G09G 3/32* (2016.01)

(52) U.S. Cl.
CPC ....... *G09G 3/32* (2013.01); *G09G 2300/0857* (2013.01); *G09G 2310/08* (2013.01)

(58) Field of Classification Search
CPC ... G09G 3/32–3291; G09G 2300/0857; G09G 2310/08
See application file for complete search history.

(56) References Cited

U.S. PATENT DOCUMENTS

| | | | | |
|---|---|---|---|---|
| 5,956,008 A * | 9/1999 | Kawasaki | G09G 3/3688 | 345/100 |
| 6,417,829 B1 * | 7/2002 | Jung | G09G 3/3688 | 345/98 |
| 6,784,880 B2 * | 8/2004 | Fujita | G11C 19/00 | 345/204 |
| 6,952,298 B2 * | 10/2005 | Hara | G09G 3/3258 | 359/244 |
| 7,129,918 B2 * | 10/2006 | Kimura | G09G 3/3266 | 345/82 |
| 7,164,405 B1 * | 1/2007 | Jeong | G09G 3/3688 | 345/94 |
| 7,936,333 B2 * | 5/2011 | Ku | G09G 3/3688 | 345/212 |
| 9,251,757 B2 * | 2/2016 | Suzuki | G09G 3/3688 | |
| 9,552,764 B2 * | 1/2017 | Toyomura | G09G 3/3225 | |
| 9,754,524 B2 * | 9/2017 | Shirasaki | G09G 3/20 | |
| 10,049,637 B2 * | 8/2018 | Lee | G09G 3/3674 | |
| 10,488,961 B2 * | 11/2019 | Wu | G06F 3/04184 | |
| 10,930,219 B2 * | 2/2021 | Chen | G09G 3/3266 | |

(Continued)

*Primary Examiner* — Gene W Lee
(74) *Attorney, Agent, or Firm* — Brake Hughes Bellermann LLP

(57) ABSTRACT

A backplane including bit lines and word lines to update a radiative state of a pixel is disclosed. The back plane includes a first delay line that replicates delays caused by a bit line and a second delay line that replicates delays caused by a word line. The replicated delays cause word line signals traveling along a first path to arrive at a pixel at approximately the same time as bit line signals traveling along a second path. The delays are added incrementally row-by-row and column-by-column so that each pixel can receive synchronized signals regardless of its position in the array of pixels.

19 Claims, 7 Drawing Sheets

(56) References Cited

U.S. PATENT DOCUMENTS

| | | | | |
|---|---|---|---|---|
| 11,614,830 | B2 * | 3/2023 | Lee | G06F 3/0412<br>345/173 |
| 11,705,083 | B2 * | 7/2023 | Kim | G09G 3/006<br>345/204 |
| 11,810,516 | B2 * | 11/2023 | Chen | G09G 3/3266 |
| 12,190,945 | B2 * | 1/2025 | Tsai | G11C 11/417 |
| 12,300,183 | B2 * | 5/2025 | Chen | G09G 3/20 |
| 2001/0022565 | A1 * | 9/2001 | Kimura | G09G 3/3266<br>345/82 |
| 2016/0365042 | A1 * | 12/2016 | Zheng | G09G 3/3677 |
| 2017/0186349 | A1 * | 6/2017 | Arima | G09G 3/006 |

* cited by examiner

SIGNAL SYNCHRONIZATION FOR A DISPLAY

CROSS-REFERENCE TO RELATED APPLICATION

This application claims the benefit of U.S. Provisional Application No. 63/591,877, filed on Oct. 20, 2023, which is hereby incorporated by reference in its entirety.

FIELD OF THE DISCLOSURE

The present disclosure relates to a display and more specifically to a backplane that is configured to generate and route signals to control pixels of the display.

BACKGROUND

A display may include an array of pixels arranged in rows (i.e. word lines) and columns (i.e. bit lines). The pixels can be controlled ON or OFF to display binary images (i.e. bit planes) in a sequence to render a grayscale image. Each pixel may include a memory cell, which controls a light emitting diode (LED) ON or OFF. Writing to the memory cell to control the pixel may require receiving a word line signal at the pixel to couple the memory cell to a bit line and receiving a bit line signal at the pixel to configure the memory cell in a state.

SUMMARY

A display is disclosed that includes delay lines to synchronize the word line signal and the bit line signal so that they arrive together at each pixel within a window of time specific to each pixel.

In some aspects, the techniques described herein relate to a backplane for a display, the backplane including: pixels in a two-dimensional array; word lines coupled to rows of pixels in the two-dimensional array; a first delay line including a first plurality of delay elements connected in series, each word line connected to an output of a corresponding delay element of the first delay line; bit lines coupled to columns of pixels; and a second delay line including a second plurality of delay elements connected in series, each bit line connected to an output of a corresponding delay element of the second delay line.

In some aspects, the techniques described herein relate to a method for controlling a pixel in a display, the method including: coupling a particular word line to a particular delay element of a first delay line, the first delay line including a first plurality of delay elements connected in series between a first input of the first delay line and the particular word line; transmitting a word line signal for the particular word line to the first input of the first delay line; coupling a particular bit line to a particular delay element of a second delay line, the second delay line including a second plurality of delay elements connected in series between a second input of the second delay line and the particular bit line; transmitting a bit line signal for the particular bit line to the second input of the second delay line; receiving the word line signal at the pixel after first delay generated by the first delay line; and receiving the bit line signal at the pixel after a second delay generated by the second delay line.

In some aspects, the techniques described herein relate to a display including: a two-dimensional array of pixels coupled to word lines and bit lines; a first delay line including a first plurality of delay elements, the word lines connected to the first delay line at outputs of the first plurality of delay elements; a second delay line including a second plurality of delay elements, the bit lines connected to the second delay line at outputs of the second plurality of delay elements; and a controller configured to: transmit a word line signal for a particular pixel to a first input of the first delay line, the word line signal delayed by a first delay generated by the first delay line; and transmit a bit line signal for the particular pixel to a second input of the second delay line, the bit line signal delayed by a second delay generated by the second delay line, the word line signal and the bit line signal reaching the particular pixel within a window of time determined by the first delay and the second delay.

The foregoing illustrative summary, as well as other exemplary objectives and/or advantages of the disclosure, and the manner in which the same are accomplished, are further explained within the following detailed description and its accompanying drawings.

BRIEF DESCRIPTION OF THE DRAWINGS

The components in the drawings are not necessarily to scale relative to each other. Like reference numerals designate corresponding parts throughout the several views.

DETAILED DESCRIPTION

A display includes an array of pixels arranged in rows and columns. A backplane for the display includes the circuitry and processing to generate, manipulate, and route signals to control the pixels. The backplane may include a word line coupled to each row of pixels and a bit line coupled to each column of pixels. A word line signal can be transmitted to a row of pixels via a word line to couple each pixel in the row to a respective bit line, and bit line signals may be transmitted to the coupled pixels to configure them in to an ON condition or an OFF condition. The bit line signals and the word line signals can experience different propagation delays as they propagate along different paths (i.e. routes) in the back plane. The different propagation delays can lead to a loss of synchronization of these signals, especially in large displays (e.g., 8K resolution) with high frame rates (e.g., 240 frames per second).

A technical problem with displays is synchronizing the bit line signals with the word line signals. A display is disclosed that addresses this technical problem through the use of delay lines in the backplane. The delay lines can equalize the propagation times for a word line signal and a bit line signal to reach a pixel. The propagation times for the word line signal and the bit line signal to reach the pixel may depend on the position of the pixel in the array of pixels. The disclosed delay lines can equalize the propagation times regardless of the position of the pixel in the array of pixels. As a result, the disclosed backplane for a display may have the technical effect of reducing pixel errors that arise when the word line signal and the bit line signals are not synchronized.

Figure 1:
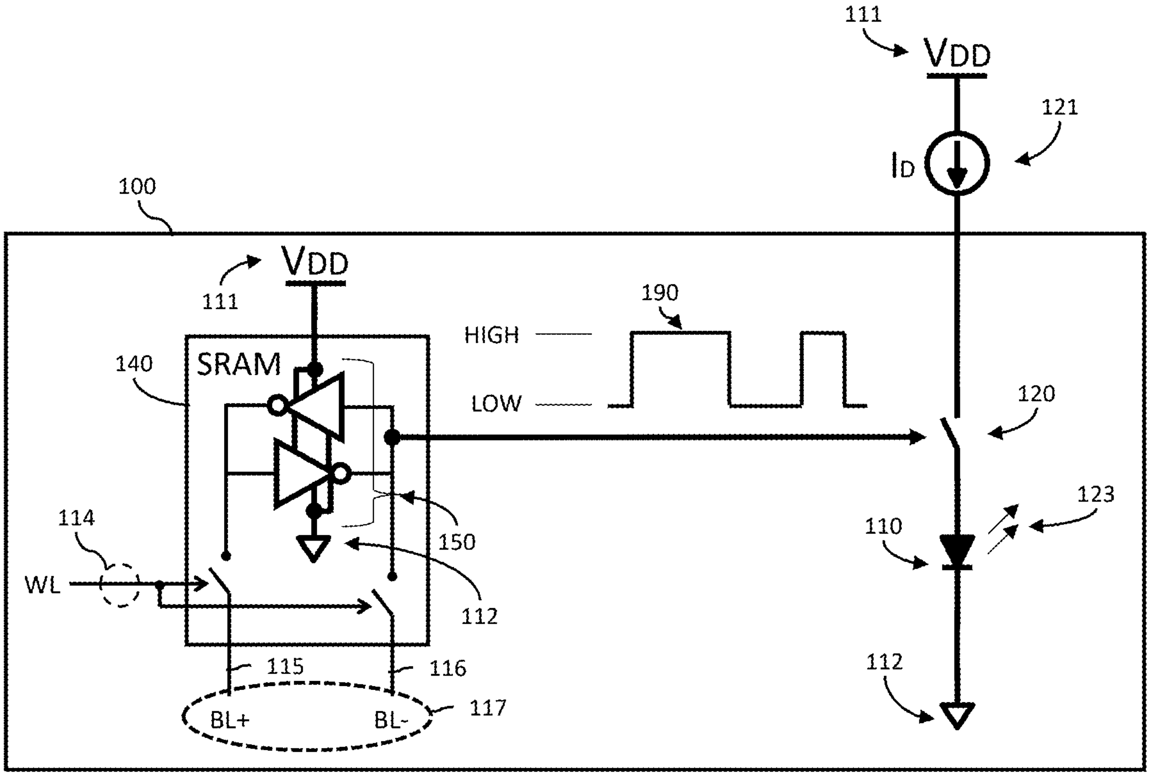
FIG. 1 is a schematic of a pixel for a display according to a possible implementation of the present disclosure.

FIG. 1 is a schematic of a pixel for a display according to a possible implementation of the present disclosure. As shown, the pixel 100 includes a drive switch 120 coupled between a light emitting diode (LED 110) and a current source 121. The LED of the pixel may have dimensions on the order of a micron (e.g., <10 μm). As a result, the LED may be referred to as a micro-LED. The drive switch 120 can be in a short circuit state (i.e., ON-condition) so that the LED 110 is illuminated (i.e., generates light 123) by the current of the current source 121. Alternatively, the drive switch 120 can be in an open circuit state (i.e., OFF-condition) so that the LED 110 is dark because it receives no current.

As shown in FIG. 1, the drive switch 120 can be controlled ON or OFF according to the state (i.e., the stored value) of a static random-access memory cell (i.e., SRAM cell 140). The SRAM cell 140 receives power for operation from a power supply. The power supply includes an upper rail voltage 111 ($V_{DD}$) and a lower rail voltage ($V_{SS}$). The lower rail voltage ($V_{SS}$) is shown as a ground voltage 112 (i.e., ground), but could be implemented differently (e.g., a negative voltage). The SRAM cell 140 may be configured to output a HIGH voltage equal to the upper rail voltage 111 (i.e., $V_{DD}$) while in a HIGH state (i.e., ON-state) or output a LOW voltage equal to the ground voltage 112 while in a LOW state (i.e., OFF-state).

An advantage of using an SRAM cell 140 to control the drive switch 120 is that while the SRAM cell 140 is in the HIGH-state (i.e., ON-state) or the LOW-state (i.e., OFF-state) it consumes very little current (e.g., approximately zero current) from the power supply. The SRAM cell 140 draws most of its current (e.g., approximately all of its current) as it transitions (i.e., is flipped) between states (i.e., during a write process).

As shown in FIG. 1, the SRAM cell 140 includes two inverters (i.e., a pair of inverters) coupled in parallel with their polarities reversed (i.e., coupled output to input). The pair of inverters function as a digital latch circuit (i.e., latch circuit 150). A write operation (i.e., write process) configures latch circuit 150 into one of two states: an ON-state to output a signal corresponding to a logical HIGH (i.e., 1) and an OFF-state to output a signal corresponding to a logical LOW (i.e., 0).

The write process to change the state of the SRAM cell 140 may include addressing the SRAM cell 140 using a word line 114 and asserting voltages on the latch circuit 150 using a positive bit line 115 (i.e., first bit line) and negative bit line 116 (i.e., second bit line), which can collectively be referred to as the bit line 117 of the pixel.

During the write process, the latch circuit 150 is coupled to the positive bit line 115 and negative bit line 116 by switches (e.g., transistors), which are controlled by a word-line signal (WL) transmitted on the word line 114. For example, a first level (e.g., HIGH) on the word line 114 turns the switches ON to couple the input/output of latch circuit 150 to respective positive/negative lines of the bit line 117. A second level (e.g., LOW) on the word line 114 turns the switches OFF to decouple the input/output of the latch circuit 150 from the bit line 117.

During a write operation, the state of the SRAM cell 140 may be flipped by a positive bit line signal (BL+) transmitted to the latch circuit 150 by the positive bit line 115 and a negative bit line signal (BL−) transmitted to the latch circuit 150 by the negative bit line 116. The applied bit line signals (BL+, BL−) correspond to the desired state of the latch. Once the desired state is set, the output of the latch circuit 150 is stable and the signals (BL+, BL−) may be removed. The state of the SRAM cell 140 appears as a voltage at the output of one of the inverters of the latch circuit 150.

The state of the SRAM cell 140 may be toggled to form a pulse width modulation signal (i.e., PWM signal 190) that controls the drive switch 120 so that a drive current ($I_D$) is received by the LED 110 during the ON portions of the PWM signal 190. The HIGH/LOW modulation of the PWM signal 190 may toggle between the upper rail voltage 111 and the lower rail voltage (i.e. ground voltage 112).

Figure 2:
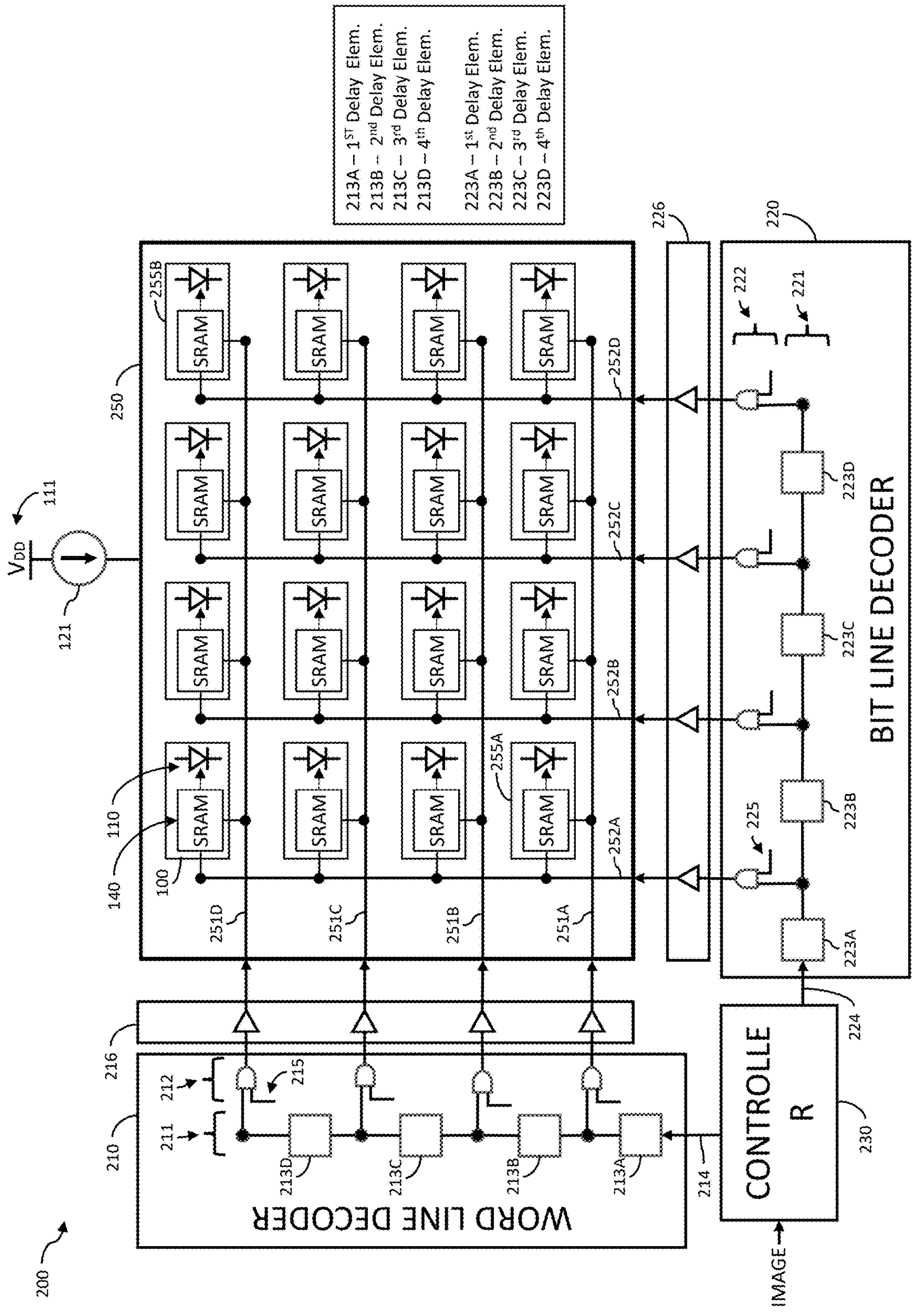
FIG. 2 is a schematic block diagram of a display according to a possible implementation of the present disclosure.

FIG. 2 is a schematic block diagram of a display according to a possible implementation of the present disclosure. The display 200 includes a plurality of pixels arranged in a two-dimensional (2D) grid (i.e., pixel array 250). Each pixel 100 includes an LED 110 (e.g., micro-LED) configured to generate light while conducting a drive current from a current source 121, which can be shared by the pixels. Each pixel 100 further includes a memory cell (e.g., SRAM cell 140) for setting and maintaining the illumination state of a LED 110 as ON or OFF.

The backplane of the display 200 includes row conductors (i.e., word lines 151A-D) and column conductors (i.e., bit lines 152A-D). The state of an SRAM cell 140 of a particular pixel of the pixel array 250 can be controlled (i.e., set/reset) by a bit line signal transmitted over a particular bit line coupled to the SRAM cell of the particular pixel. The SRAM cell of the particular pixel is coupled to the bit line based on a word line signal transmitted over a particular word line to the particular pixel. The particular word line can be selected (i.e., activated) by a word line decoder 210 so that the writing process may proceed row-by-row for the entire pixel array 250.

The display 200 includes a controller 230 configured to receive an image. The controller may process the image to generate the necessary word line signals and bit line signals to control the pixels according to the image. In a possible implementation, the image is a bit plane of a sequence of bit planes used to generate a grayscale image. The controller 230 is coupled to a word line decoder 210 and a bit line decoder 220. The controller 230 may be configured to transmit a word line signal to the word line decoder 210 to activate a row of the pixel array 250. The controller 230 may be further configured to transmit a bit line signal to the bit line decoder to control a pixel in the activated row to be ON or OFF. For example, the controller 230 may sequentially transmit data (e.g., binary data) of a row of the image to the bit line decoder sequentially so that it can be transmitted to the corresponding row of pixels.

The word line decoder 210 includes a first delay line 211. The first delay line 211 includes a first plurality of delay elements 213A-D that are connected in series. The word lines 251A-D can tap into (i.e., couple to) the first delay line 211 at outputs of the delay elements 213A-D to receive delayed versions of a word line signal received at a first input 214 of the first delay line 211. For example, a word line signal received at a third word line 251C is delayed by a first delay element 213A, a second delay element 213B, and a third delay element 213C. The delay generated by each delay element may be substantially the same. Word lines that are further from the first input 214 may receive word line signals that are delayed more than word line signals received at word lines that are closer to the first input 214. For example, a word line signal for the third word line 251C is delayed by a delay generated by three delay elements (213A, 213B, 213C) between the first input 214 and the third word line 251C, while a word line signal for the second word line 251B is delayed be a delay generated by two delay elements (213A, 213B) between the first input 214 and the second word line 251B.

The word line decoder 210 can further include logic gates 212 coupled between each delay element of the first delay line 211 and corresponding word lines. The word line decoder 210 may be configured to transmit a gate signal to a particular logic gate to couple a word line signal from the first delay line 211 to a particular word line. For example, a logic gate may be an AND gate configured to receive a word line signal at a first input and a gate signal at a second input 215. The word line signal may be a logical HIGH pulse that is sequentially received at each AND gate as it propagates along the first delay line 211. The gate signal may be a logical HIGH at the AND gate of the active row and a logical LOW level at the AND gates of the other rows. It should be noted that the logic gates 212 are not limited to any particular logic gate and more complex logic may be used to route the word line signal. The display 200 can further include a word line driver 216 configured to buffer the word lines from the word line decoder 210 and provide power to transmit the word line signals The bit line decoder 220 includes a second delay line 221. The second delay line 221 includes a second plurality of delay elements 213A-D that are connected in series. The bit lines 252A-D can tap into (i.e., couple to) the second delay line 221 at outputs of the delay elements 223A-D to receive delayed versions of a word line signal received at a second input 224 of the second delay line 221. For example, a bit line signal received at a third bit line 252C is delayed by a first delay element 223A, a second delay element 223B, and a third delay element 223C. The delay generated by each delay element may be substantially the same. Bit lines that are further from the second input 224 may receive bit line signals that are delayed more than bit line signals received at bit lines that are closer to the second input 224. For example, a bit line signal for the third bit line 252C is delayed by a delay generated by three delay elements (223A, 223B, 223C) between the second input 224 and the third bit line 252C, while a bit line signal for the second bit line 252B is delayed be a delay generated by two delay elements (223A, 223B) between the second input 224 and the second bit line 252B.

The bit line decoder 220 can further include logic gates 222 coupled between each delay element of the second delay line 221 and corresponding bit lines. The bit line decoder 220 may be configured to transmit a gate signal to an input 225 of a particular logic gate to couple a bit line signal from the second delay line 221 to a particular bit line. The logic gates 222 are not limited to the particular logic gate shown and more complex logic may be used to route the bit line signals. The display 200 can further include a bit line driver 226 configured to buffer the bit lines from the bit line decoder 220 and provide power to transmit the bit line signals.

Figure 3:
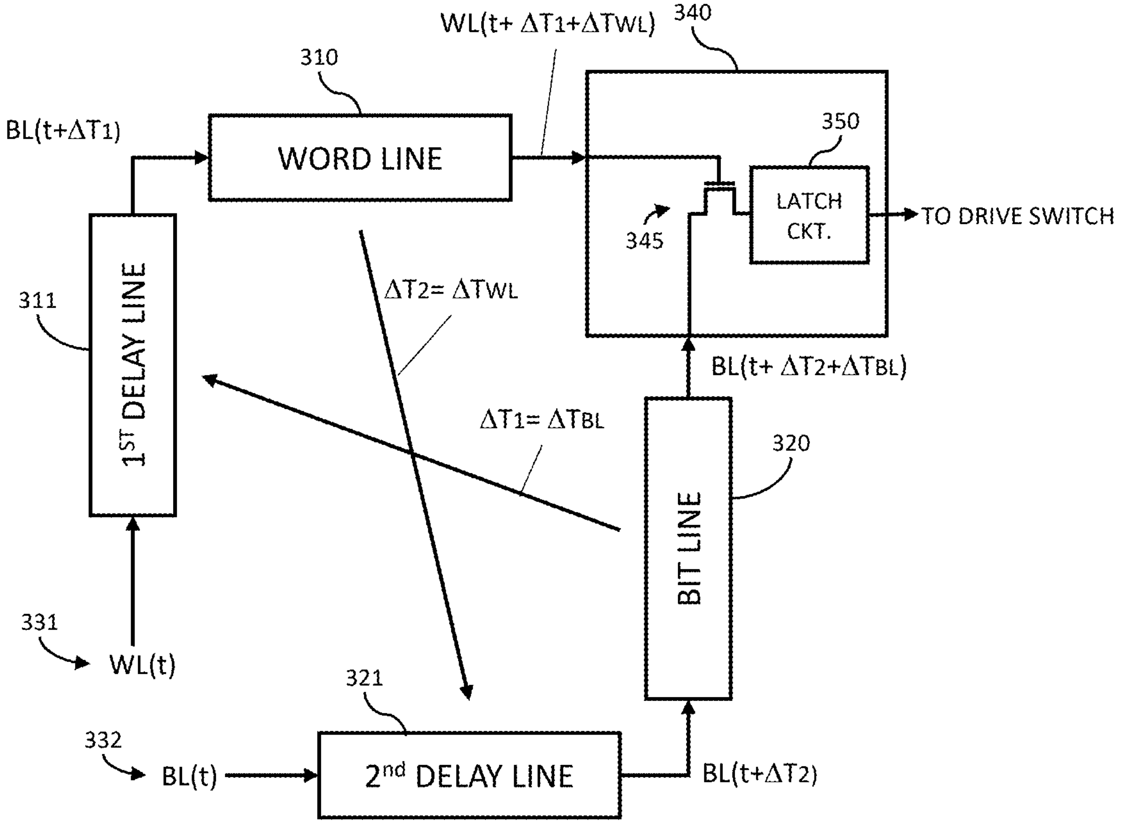
FIG. 3 illustrates the signal synchronization for the backplane according to a possible implementation of the present disclosure.

FIG. 3 illustrates the signal synchronization for the backplane according to a possible implementation of the present disclosure. As shown, a memory cell 340 of a particular pixel in the display receives a word line signal 331 after a first delay ($\Delta T_1$) generated by a first delay line 311 and after a word line delay ($\Delta T_{WL}$) generated by the word line 310 coupling the memory cell 340 of the particular pixel to the first delay line 311. The word line delay can be related to the length of the word line between the particular pixel and first delay line 311. The word line delay can also be related to other characteristics (e.g., width, parasitic capacitance, etc.) of the word line, which can delay (i.e. slow) the word line signal 331.

The memory cell 340 of the particular pixel in the display receives a bit line signal 332 after a second delay ($\Delta T_2$) generated by a second delay line 321 and after a bit line delay ($\Delta T_{BL}$) generated by the bit line 320 coupling the memory cell 340 of the particular pixel to the second delay line 321. The bit line delay ($\Delta T_{BL}$) can be related to the length of the bit line between the particular pixel and the second delay line 321. The bit line delay can also be related to other characteristics (e.g., width, parasitic capacitance, etc.) of the bit line, which can delay (i.e. slow) the bit line signal 332.

The first delay ($\Delta T_1$) generated by the first delay line 311 can be made to approximate (e.g., equal) the bit line delay ($\Delta T_{BL}$) generated by the segment of the bit line 320 coupling the memory cell 340 to the second delay line 321 (e.g., $\Delta T_1 = \Delta T_{BL}$). Likewise, the second delay ($\Delta T_2$) generated by the second delay line 321 can be made to approximate (e.g., equal) the word line delay ($\Delta T_{WL}$) generated by the segment of the word line 310 coupling the memory cell 340 to the first delay line 311 (e.g., $\Delta T_2 = \Delta T_{WL}$). As a result, the word line signal 331 and the bit line signal 332 reach the memory cell 340 of a particular pixel at the same time. In practice, the bit line signal 332 may be transmitted slightly before the word line signal 331 so that the bit line signal (i.e., image data) can stabilize at the memory cell 340 before being coupled to a latch circuit 350 for storage. As shown, the memory cell 340 includes a transistor 345 controlled by the word line signal 331 to couple the bit line signal to the latch circuit 350. The state of the latch circuit may be used to control a drive switch (i.e., second transistor) of the pixel to couple or decouple a light emitting diode of the pixel to a current source in order to turn-ON (i.e., illuminate) or turn-OFF (i.e., darken) the pixel.

Figure 4:
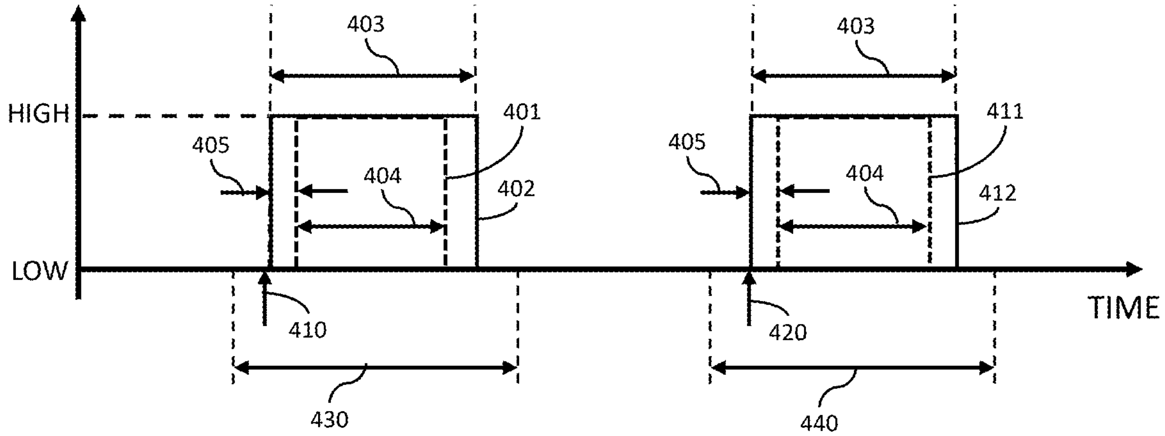
FIG. 4 is a graph illustrating word line signals and bit line signals received at pixels in a display according to a possible implementation of the present disclosure.

FIG. 4 is a graph illustrating word line signals and bit line signals received at pixels in a display according to a possible implementation of the present disclosure. As shown, a first word line signal 401 and a first bit line signal 402 received at a first pixel of a display are plotted with a second word line signal 411 and a second bit line signal 412 received at a second pixel of the display.

The first word line signal 401 may be a pulse having a first width 404, and the first bit line signal 402 may be a pulse having a second width 403. The first width 404 may be shorter than the second width 403. In other words, a bit line signal may have a pulse width that is greater than the pulse width of the word line signal. This is not a requirement, however, and in alternative implementations, the word line signal may have a pulse width that is greater than the bit line signal. Alternatively, the pulse widths may be the equal.

The first bit line signal 402 may be received at a first time 410 before the first word line signal 401 so that the signals have an offset 405. The signals can overlap (i.e. appear simultaneously at the first pixel) for the entire first width 404. As shown, the first bit line signal 402 and the first word line signal 401 are received at the first pixel within a first window of time 430. The synchronization of the signals can result in the period of the first window of time 430 being very small. The first bit line signal 402 is shown in FIG. 4 as a HIGH logical pulse but in practice a bit line signal may be HIGH or LOW based on the image data.

The second word line signal 411 may be the pulse having the first width 404 and the second bit line signal 412 may be the pulse having the second width 403. As shown, the second bit line signal 412 may be received at a second time 420 before the second word line signal 411 is received so that the signals have the offset 405. The signals are received simultaneously at the second pixel within a second window of time 440.

Each pixel in the display may be configured to receive the word line signal and the bit line signal within a window of time determined by the position of the pixel within the display. Each pixel in the two-dimensional array receives a corresponding word line signal and bit line signal at a time corresponding to a position of each pixel in the two-dimensional array. The window of time during which the signals are received is determined, in part, by the first delay line and the second delay line for the pixel.

Each pixel may have a unique delay so that the synchronization is independent of the pixel's location in the array. The delay lines synchronize the signals reaching the pixel (i.e. memory cell). The delay generated by the delay lines may track temperature, process corner variations, and voltage level variations so that synchronization for each pixel can withstand a wide range of variations. What is more, the synchronization that can reduce a period for updating (writing) to the memory cells of the pixels. As a result, the synchronization can enable high frequency performance of the display by shortening a timing window required for writing to (i.e. updating) the pixels.

Figure 5:
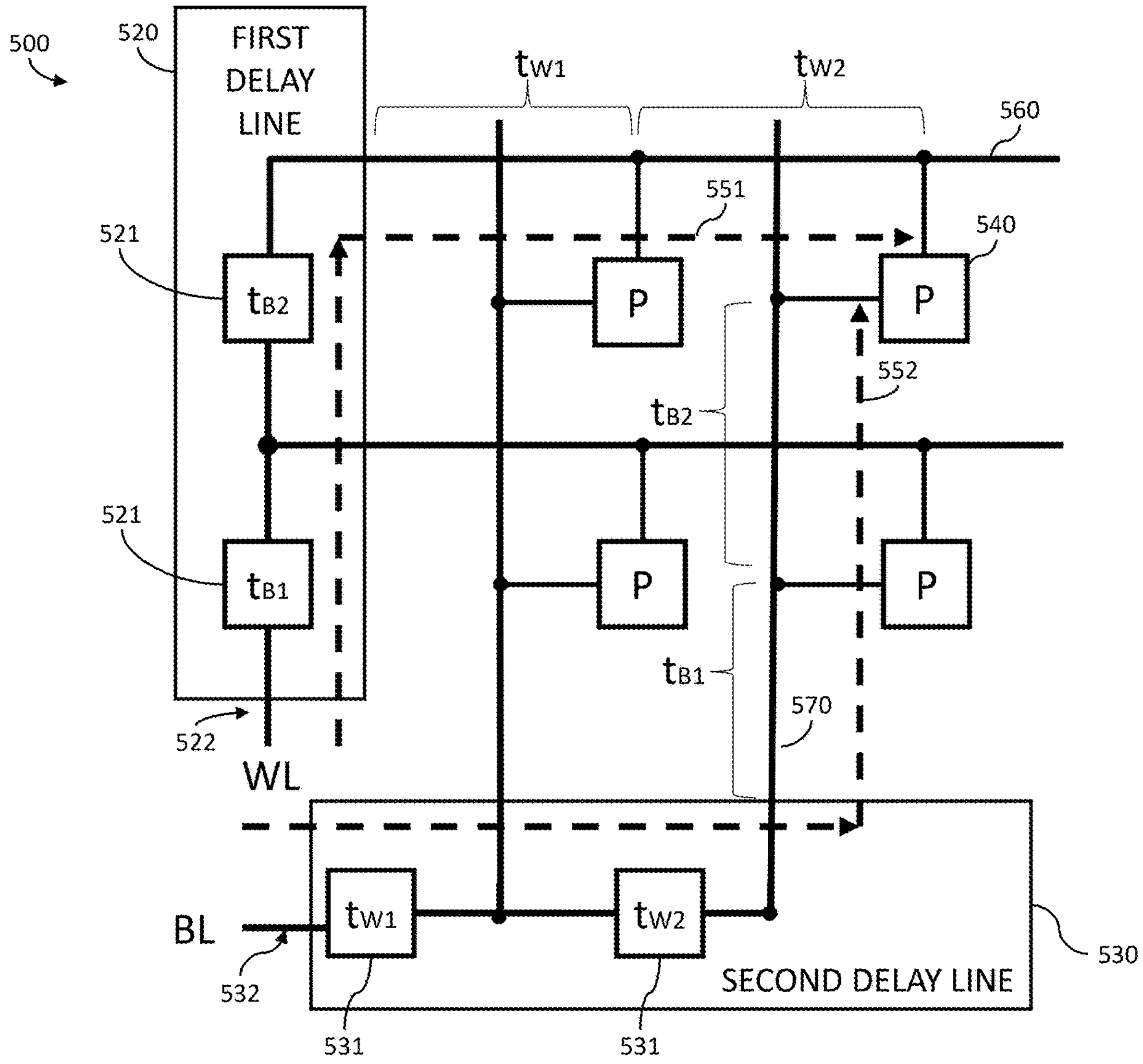
FIG. 5 illustrates a portion of a backplane for a display according to a possible implementation of the present disclosure.

FIG. 5 illustrates a portion of a backplane for a display according to a possible implementation of the present disclosure. The figure helps explain how signals to update a radiative state of a particular pixel 540 are synchronized. As shown, the backplane 500 receives a word line signal (WL) for the particular pixel 540 at a first input 522 of a first delay line 520. The backplane 500 further receives a bit line signal (BL) for the particular pixel 540 at a second input 532 of a second delay line 530.

To update the radiative state of the particular pixel 540, the word line signal (WL) is transmitted along a word-line path 551 and the bit line signal (BL) is transmitted along a bit-line path 552. The word-line path 551 for the particular pixel 540 includes a cumulative word-line delay ($t_{W1}+t_{W2}$) due to the lengths of two segments of the word line 560 between the first delay line 520 and the particular pixel 540. The bit-line path 552 for the particular pixel 540 includes a cumulative bit-line delay ($t_{B1}+t_{B2}$) due to the lengths of two segments of the bit line 570 between the second delay line 530 and the particular pixel 540.

In order to synchronize the times of arrival at the particular pixel 540, delays are inserted into each path by the delay lines. Each delay line includes delay elements that are replicas of the delays experienced in the segments of the corresponding path. For example, the word-line path 551 through the first delay line 520 passes through two delay elements that replicate the cumulative bit-line delay ($t_{B1}+t_{B2}$), and the bit-line path 552 through the second delay line 530 passes through two delay elements that replicate the cumulative word-line delay ($t_{W1}+t_{W2}$). Accordingly, the word line signal traveling along the word-line path 551 experiences the same delay as the bit line signal traveling along the bit-line path 552.

Each delay element 521 of the first delay line 520 corresponds to a segment of the bit line 570. A segment of the bit line can be a portion of the bit line between pixels or between an input and a pixel. Each delay element 531 of the second delay line 530 corresponds to a segment of the word line 560. A segment of the word line can be a portion of the word line between pixels or between an input and a pixel.

A pixel in the two-dimensional array can receive a corresponding word line signal (WL) and a bit line signal (BL) at a time corresponding to a position of the pixel in the two-dimensional array. The time may be based on at least the delay elements of the first delay line 520 and the second delay line 530 encountered on the particular path to the pixel.

Each pixel is located at a row position (i.e., vertical position) and a column position (i.e., horizontal position) in the display. Because each row of the display includes an incremental bit-line delay (e.g., $t_{B1}$, $t_{B2}$, etc.), a cumulative bit-line delay (e.g., $t_{B1}+t_{B2}$) may be added to a word-line delay based on the row position of a pixel. Because each column of the display includes an incremental delay (e.g., $t_{W1}$, $t_{W2}$, etc.), a cumulative word-line delay (e.g., $t_{W1}+t_{W2}$) may be added to a bit-line delay based on the column position of a pixel.

Figure 6:
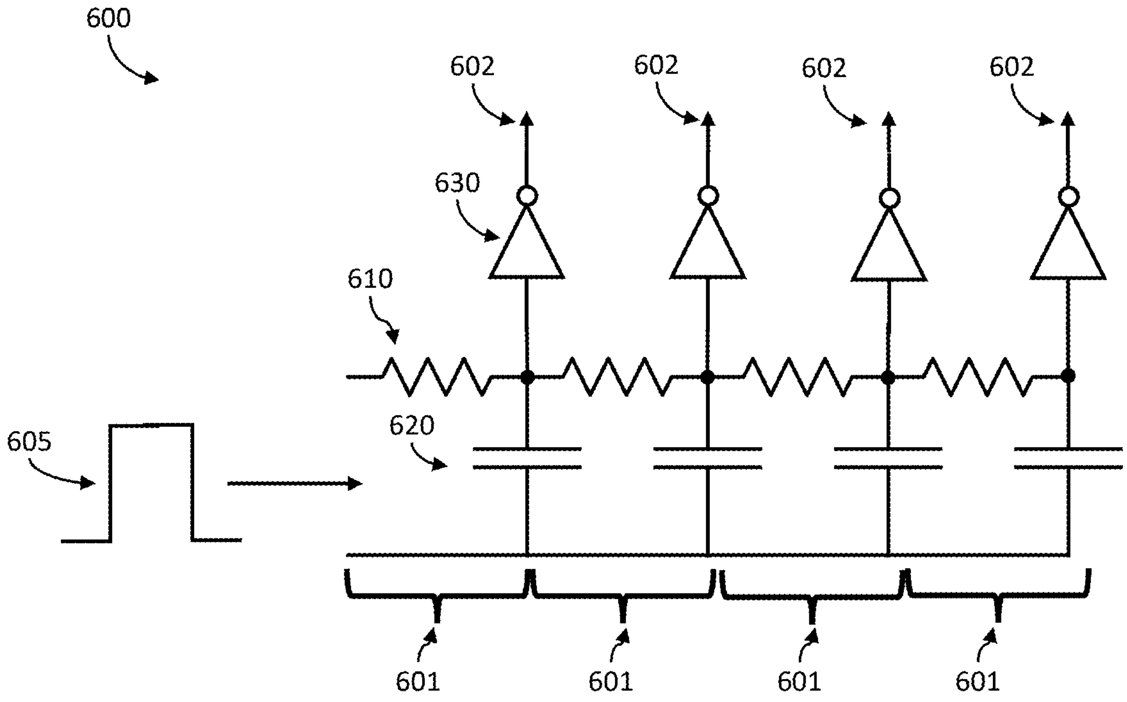
FIG. 6 illustrates a delay line according to a possible implementation of the present disclosure.

FIG. 6 illustrates a delay line according to a possible implementation of the present disclosure. The delay line 600 includes a plurality of delay elements. The plurality of delay elements may be repeated versions of a delay element 601 connected in series. A signal 605 (e.g., word line signal, bit line signal) that is input to the delay line will appear at each output 602 after a delay. The input signal is delayed at a particular output by a delay that is based on the number of delay elements between the input and the particular output. In other words, the delay line can be tapped at the output of each delay element 601 to provide incrementally increasing delays at the outputs. These taps may be connected to bit lines or word lines to provide delays for the pixels in a two-dimensional array that correspond to the positions of the pixels in the two-dimensional array. In a possible implementation, each delay element includes a resistor-capacitor circuit including at least one resistor 610 and at least one capacitor 620. Each delay element may further include at least one logic gate (e.g., inverter gate 630) configured to help reproduce the pulse input signal at the output of the delay line 600. The present disclosure is not limited to the delay line implementation shown in FIG. 6, as delay lines may be implemented in various ways that are known to those skilled in the art.

Figure 7:
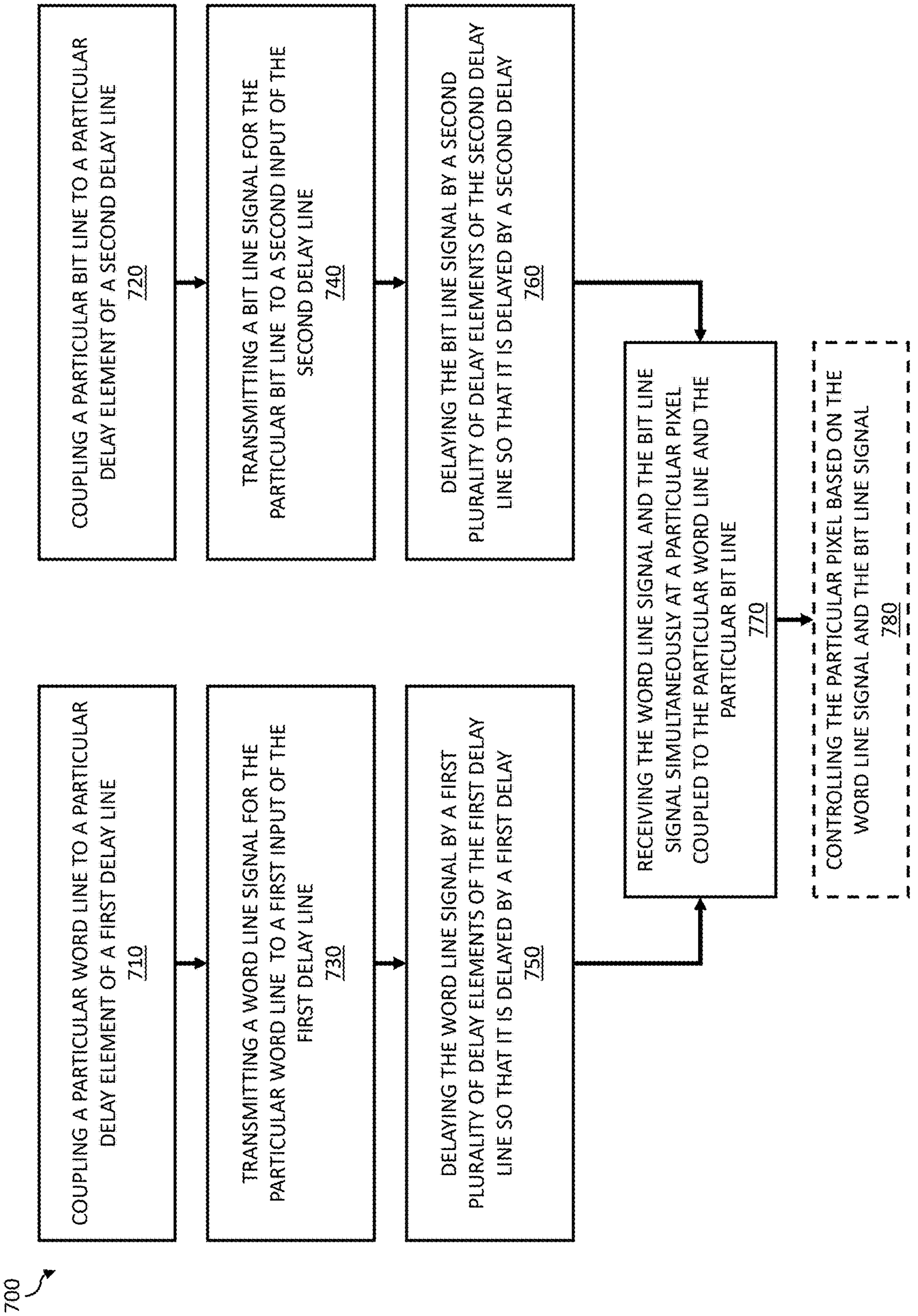
FIG. 7 is a flowchart of a method for controlling a pixel in a display according to a possible implementation of the present disclosure.

FIG. 7 is a flowchart of a method for controlling a pixel in a display according to a possible implementation of the present disclosure. The method 700 includes coupling 710 a particular word line to a particular delay element of a first delay line. The first delay can include a first plurality of delay elements connected in series between a first input of the first delay line and the particular word line. The method 700 further includes coupling 720 a particular bit line to a particular delay element of a second delay line. The second delay can include a second plurality of delay elements connected in series between a second input of the second delay line and the particular bit line. The method 700 further includes transmitting 730 a word line signal for the particular word line to the first input of the first delay line and transmitting 740 a bit line signal for the particular bit line to the second input of the second delay line. The method 700 further includes delaying 750 the word line signal by the first plurality of delay elements of the first delay line so that it is delayed by a first delay. The method 700 further includes delaying 760 the bit line signal by the second plurality of delay elements of the second delay line so that it is delayed by a second delay. The method 700 further includes receiving 770 the word line signal and the bit line signal simultaneously at a particular pixel coupled to the particular word line and the particular bit line. The method 700 can further include controlling 780 the particular pixel based on the word line signal and the bit line signal The backplane described can help to equalize propagation delays of a word line path and a bit line path to a pixel. The equalization can help reduce a misalignment between the timing of the (bit) data and the word line signal, which could otherwise allow the wrong data to be loaded into the pixels if the bit lines and word lines were switched too quickly. The backplane of the present disclosure makes a first propagation delay (i.e. word-line path delay) experienced by the word line signals (rows) equal to a second propagation delay (i.e. bit-line path delay) experienced by the bit line signals (columns). Each pixel in a pixel array may have a unique row and column connection and therefore has a unique word-line delay and bit-line delay.

In the specification and/or figures, typical embodiments have been disclosed. The present disclosure is not limited to such exemplary embodiments. The use of the term "and/or" includes any and all combinations of one or more of the associated listed items. The figures are schematic representations and so are not necessarily drawn to scale. Unless otherwise noted, specific terms have been used in a generic and descriptive sense and not for purposes of limitation.

Unless defined otherwise, all technical and scientific terms used herein have the same meaning as commonly understood by one of ordinary skill in the art. Methods and materials similar or equivalent to those described herein can be used in the practice or testing of the present disclosure. As used in the specification, and in the appended claims, the singular forms "a," "an," "the" include plural referents unless the context clearly dictates otherwise. The term "comprising" and variations thereof as used herein is used synonymously with the term "including" and variations thereof and are open, non-limiting terms. The terms "optional" or "optionally" used herein mean that the subsequently described feature, event or circumstance may or may not occur, and that the description includes instances where said feature, event or circumstance occurs and instances where it does not. Ranges may be expressed herein as from "about" one particular value, and/or to "about" another particular value. When such a range is expressed, an aspect includes from the one particular value and/or to the other particular value. Similarly, when values are expressed as approximations, by use of the antecedent "about," it will be understood that the particular value forms another aspect. It will be further understood that the endpoints of each of the ranges are significant both in relation to the other endpoint, and independently of the other endpoint.

Some implementations may be implemented using various semiconductor processing and/or packaging techniques. Some implementations may be implemented using various types of semiconductor processing techniques associated with semiconductor substrates including, but not limited to, for example, Silicon (Si), Gallium Arsenide (GaAs), Gallium Nitride (GaN), Silicon Carbide (SiC) and/or so forth.

While certain features of the described implementations have been illustrated as described herein, many modifications, substitutions, changes and equivalents will now occur to those skilled in the art. It is, therefore, to be understood that the appended claims are intended to cover all such modifications and changes as fall within the scope of the implementations. It should be understood that they have been presented by way of example only, not limitation, and various changes in form and details may be made. Any portion of the apparatus and/or methods described herein may be combined in any combination, except mutually exclusive combinations. The implementations described herein can include various combinations and/or sub-combinations of the functions, components and/or features of the different implementations described.

It will be understood that, in the foregoing description, when an element is referred to as being on, connected to, electrically connected to, coupled to, or electrically coupled to another element, it may be directly on, connected or coupled to the other element, or one or more intervening elements may be present. In contrast, when an element is referred to as being directly on, directly connected to or directly coupled to another element, there are no intervening elements present. Although the terms directly on, directly connected to, or directly coupled to may not be used throughout the detailed description, elements that are shown as being directly on, directly connected or directly coupled can be referred to as such. The claims of the application, if any, may be amended to recite exemplary relationships described in the specification or shown in the figures.

As used in this specification, a singular form may, unless definitely indicating a particular case in terms of the context, include a plural form. Spatially relative terms (e.g., over, above, upper, under, beneath, below, lower, and so forth) are intended to encompass different orientations of the device in use or operation in addition to the orientation depicted in the figures. In some implementations, the relative terms above and below can, respectively, include vertically above and vertically below. In some implementations, the term adjacent can include laterally adjacent to or horizontally adjacent to.

What is claimed is:

1. A backplane for a display, the backplane comprising:
pixels in a two-dimensional array;
word lines coupled to rows of pixels in the two-dimensional array;
a first delay line including a first plurality of delay elements connected in series, the word lines being connected to respective outputs of corresponding delay elements of the first delay line, wherein each delay element of the first plurality of delay elements includes a first resistor-capacitor circuit;
bit lines coupled to columns of pixels; and
a second delay line including a second plurality of delay elements connected in series, each bit line connected to an output of a corresponding delay element of the second delay line, wherein each delay element of the second plurality of delay elements includes a second resistor-capacitor circuit.

2. The backplane for the display according to claim 1, wherein a word line signal and a bit line signal transmitted to a particular pixel in the two-dimensional array are delayed by the first delay line and the second delay line respectively so that the word line signal and the bit line signal arrive at the particular pixel within a window of time.

3. The backplane for the display according to claim 1, wherein:
each delay element of the first plurality of delay elements is configured to generate a first delay corresponding to a bit line delay generated by a segment of a bit line; and
each delay element of the second plurality of delay elements is configured to generate a second delay corresponding to a word line delay generated by a segment of a word line.

4. The backplane for the display according to claim 1, wherein each pixel in the two-dimensional array receives a corresponding word line signal and a bit line signal at a time corresponding to a position of each pixel in the two-dimensional array, the time determined by the first delay line and the second delay line.

5. The backplane for the display according to claim 1, further comprising a controller configured to:

transmit a word line signal for a particular word line to a first input of the first delay line and a bit line signal for a particular bit line to a second input of the second delay line.

6. The backplane for the display according to claim 5, wherein the bit line signal is transmitted before the word line signal.

7. The backplane for the display according to claim 5, wherein:

the word line signal is a first pulse having a first width; and the bit line signal is a second pulse having a second width, the second width greater than the first width.

8. The backplane for the display according to claim 5, wherein:

the word line signal is delayed by a first delay generated by a first number of delay elements of the first delay line between the first input and the particular word line; and the bit line signal is delayed by a second delay generated by a second number of delay elements of the second delay line between the second input and the particular bit line.

9. The backplane for the display according to claim 1, further comprising a word line decoder that includes the first delay line and logic gates coupled between each delay element of the first plurality of delay elements and a corresponding word line.

10. The backplane for the display according to claim 9, wherein the word line decoder is configured to transmit a gate signal to a particular logic gate to couple a word line signal from the first delay line to a particular word line.

11. The backplane for the display according to claim 1, wherein:

a particular pixel of the two-dimensional array is coupled to a particular word line and a particular bit line;

a first input of the first delay line is configured to receive a word line signal for the particular word line;

a second input of the second delay line is configured to receive a bit line signal for the particular bit line; and the word line signal and the bit line signal reach the particular pixel within a window of time based on a first delay generated by the first delay line and a second delay generated by the second delay line.

12. The backplane for the display according to claim 11, wherein:

the first delay is generated by a first number of delay elements of the first delay line between the first input and the particular word line; and the second delay is generated by a second number of delay elements of the second delay line between the second input and the particular bit line.

13. The backplane for the display according to claim 11, wherein:

a first pixel positioned in the two-dimensional array closer to the first input and the second input receives a first word line signal and a first bit line signal within a first window; and a second pixel positioned in the two-dimensional array further from the first input and the second input receives a second word line signal and a second bit line signal within a second window, the second window being at a later time than the first window.

14. A method for controlling a pixel in a display, the method comprising:

coupling a particular word line to a particular delay element of a first delay line, the first delay line including a first plurality of delay elements connected in series between a first input of the first delay line and the particular word line, wherein each delay element of the first plurality of delay elements includes a first resistor-capacitor circuit;

transmitting a word line signal for the particular word line to the first input of the first delay line;

coupling a particular bit line to a particular delay element of a second delay line, the second delay line including a second plurality of delay elements connected in series between a second input of the second delay line and the particular bit line, wherein each delay element of the second plurality of delay elements includes a second resistor-capacitor circuit;

transmitting a bit line signal for the particular bit line to the second input of the second delay line;

receiving the word line signal at the pixel after first delay generated by the first delay line; and receiving the bit line signal at the pixel after a second delay generated by the second delay line.

15. The method for controlling the pixel in the display according to claim 14, further comprising:

delaying the word line signal by the first plurality of delay elements of the first delay line so that it is delayed by the first delay, each delay element of the first plurality of delay elements corresponding to a segment of the particular bit line;

delaying the bit line signal by the second plurality of delay elements of the second delay line so that it is delayed by the second delay, each delay element of the second plurality of delay elements corresponding to a segment of the particular word line; and receiving the word line signal and the bit line signal simultaneously at a particular pixel coupled to the particular word line and the particular bit line.

16. The method for controlling the pixel in the display according to claim 14, further comprising:

controlling a first transistor of the pixel in an ON condition using the word line signal;

coupling a memory cell of the pixel to the particular bit line using the first transistor in the ON condition; and configuring the memory cell in a state using the bit line signal.

17. The method for controlling the pixel in the display according to claim 16, further comprising:

controlling a second transistor coupling a light emitting diode of the pixel to a current source based on the state of the memory cell.

18. A display comprising:

a two-dimensional array of pixels coupled to word lines and bit lines;

a first delay line including a first plurality of delay elements, the word lines connected to the first delay line at respective outputs of the first plurality of delay elements;

a second delay line including a second plurality of delay elements, the bit lines connected to the second delay line at respective outputs of the second plurality of delay elements; and a controller configured to:

transmit a word line signal for a particular pixel to a first input of the first delay line, the word line signal delayed by a first delay generated by the first delay line; and transmit a bit line signal for the particular pixel to a second input of the second delay line, the bit line signal delayed by a second delay generated by the second delay line, the word line signal and the bit line signal reaching the particular pixel within a window of time determined by the first delay and the second delay, wherein each delay element of the first plurality of delay elements includes a first resistor-capacitor circuit and each delay element of the second plurality of delay elements includes a second resistor-capacitor circuit.

19. The display according to claim 18, wherein:

the first delay corresponds to a delay generated by a bit line coupling the particular pixel to the second delay line; and the second delay corresponds to a delay generated by a word line coupling the particular pixel to the first delay line.

* * * * *